(12) United States Patent
Sugita et al.

(10) Patent No.: US 9,249,591 B2
(45) Date of Patent: Feb. 2, 2016

(54) SEISMIC ISOLATION STRUCTURE FOR EQUIPMENT, AND SEISMIC ISOLATION METHOD

(71) Applicant: ANSHIN CO., LTD., Aichi (JP)

(72) Inventors: Kikuo Sugita, Aichi (JP); Shinji Murase, Aichi (JP)

(73) Assignee: ANSHIN CO., LTD., Aichi (JP)

( * ) Notice: Subject to any disclaimer, the term of this patent is extended or adjusted under 35 U.S.C. 154(b) by 0 days.

(21) Appl. No.: 14/380,567

(22) PCT Filed: Feb. 21, 2013

(86) PCT No.: PCT/JP2013/000999
§ 371 (c)(1),
(2) Date: Dec. 16, 2014

(87) PCT Pub. No.: WO2013/125234
PCT Pub. Date: Aug. 29, 2013

(65) Prior Publication Data
US 2015/0225975 A1    Aug. 13, 2015

(30) Foreign Application Priority Data

Feb. 22, 2012  (JP) ................................ 2012-036035

(51) Int. Cl.
*E04H 9/02* (2006.01)
*F16F 15/02* (2006.01)
*F16M 7/00* (2006.01)

(52) U.S. Cl.
CPC ................ *E04H 9/028* (2013.01); *F16F 15/02* (2013.01); *F16M 7/00* (2013.01)

(58) Field of Classification Search
CPC ......... E04H 9/021; E04H 9/029; F16F 1/445; F16F 1/36; F16F 1/37; F16F 1/3605; F16F 15/021; F16F 15/08; F16F 2236/045; F16F 7/00; F16F 7/10; F16M 7/00
See application file for complete search history.

(56) References Cited

U.S. PATENT DOCUMENTS 2,425,566 A * 8/1947 Robinson ................ F16F 1/445
                                                    267/140.3
2,936,139 A * 5/1960 Lindstrom ............... B41J 29/06
                                                    248/362

(Continued)

FOREIGN PATENT DOCUMENTS

DE       2354856 A1 *  5/1975  ................ F16F 1/37
JP       4-307234        10/1992

(Continued)

OTHER PUBLICATIONS

International Search Report for Application No. PCT/JP2013/000999, 2 pages, dated May 21, 2013.

*Primary Examiner* — Christine T Cajilig
(74) *Attorney, Agent, or Firm* — Nelson Mullins Riley & Scarborough LLP; Anthony A. Laurentano

(57) ABSTRACT

Plastically deformable support bodies (16) are embedded in a gel-like elastic body (15). A bottom-surface adhesive layer (15b) of the gel-like elastic body (15) is bonded to a floor surface (F), and a pressurizing plate (13) is kept on a top-surface adhesive layer (15a). A leg section (2) of equipment (1) is restrained from moving laterally with a bolt (22) provided on the pressurizing plate (13). A load of the equipment (1) is used to apply pressure to a vibration-damping pad (12) via the pressurizing plate (13). A restraint wall (18) is disposed around the vibration-damping pad (12) and a caulking compound (20) is packed in the opening between the pressurizing plate (13) and the floor surface (F). The caulking compound (20) is blocked by the restraint wall (18), and the gel-like elastic body (15) is allowed to deform due to a gap (19) formed between the restraint wall (18) and the vibration-damping pad (12). According to the present invention, a simple and hygienic seismic isolation structure can be used to prevent vibration, noise, and toppling of equipment installed on a floor surface without using anchor bolts.

15 Claims, 13 Drawing Sheets

(56) References Cited

U.S. PATENT DOCUMENTS

| | | | | |
|---|---|---|---|---|
| 3,477,674 A | * | 11/1969 | Schaller | F16F 1/44 248/615 |
| 4,576,357 A | * | 3/1986 | Schrepfer | F16M 7/00 248/188.2 |
| 5,042,765 A | * | 8/1991 | Widerstrom | A47B 91/04 248/188.3 |
| 5,310,156 A | * | 5/1994 | Matsumura | A47B 91/00 248/188.9 |
| 5,461,835 A | * | 10/1995 | Tarics | F16F 7/108 248/632 |
| 6,251,493 B1 | * | 6/2001 | Johnson | F16F 1/37 428/220 |
| 2008/0060303 A1 | * | 3/2008 | Sugita | A47B 91/00 52/411 |
| 2011/0084165 A1 | * | 4/2011 | Ulbrich-Gasparevic | B64D 11/00 244/118.6 |

FOREIGN PATENT DOCUMENTS

| | | |
|---|---|---|
| JP | 5-177762 | 7/1993 |
| JP | 9-181459 | 7/1997 |
| JP | 10-512201 | 11/1998 |
| JP | 2000-55124 | 2/2000 |
| JP | 2007-12228 | 1/2007 |
| JP | 2007-120525 | 5/2007 |
| JP | 2010-283081 | 12/2010 |
| WO | WO 2007114072 A1 * 10/2007 | ............. E04H 9/023 |

* cited by examiner (a)

(b)

(a)

(b)

(a)

(b)

(a)

(b)

(a)

(b)

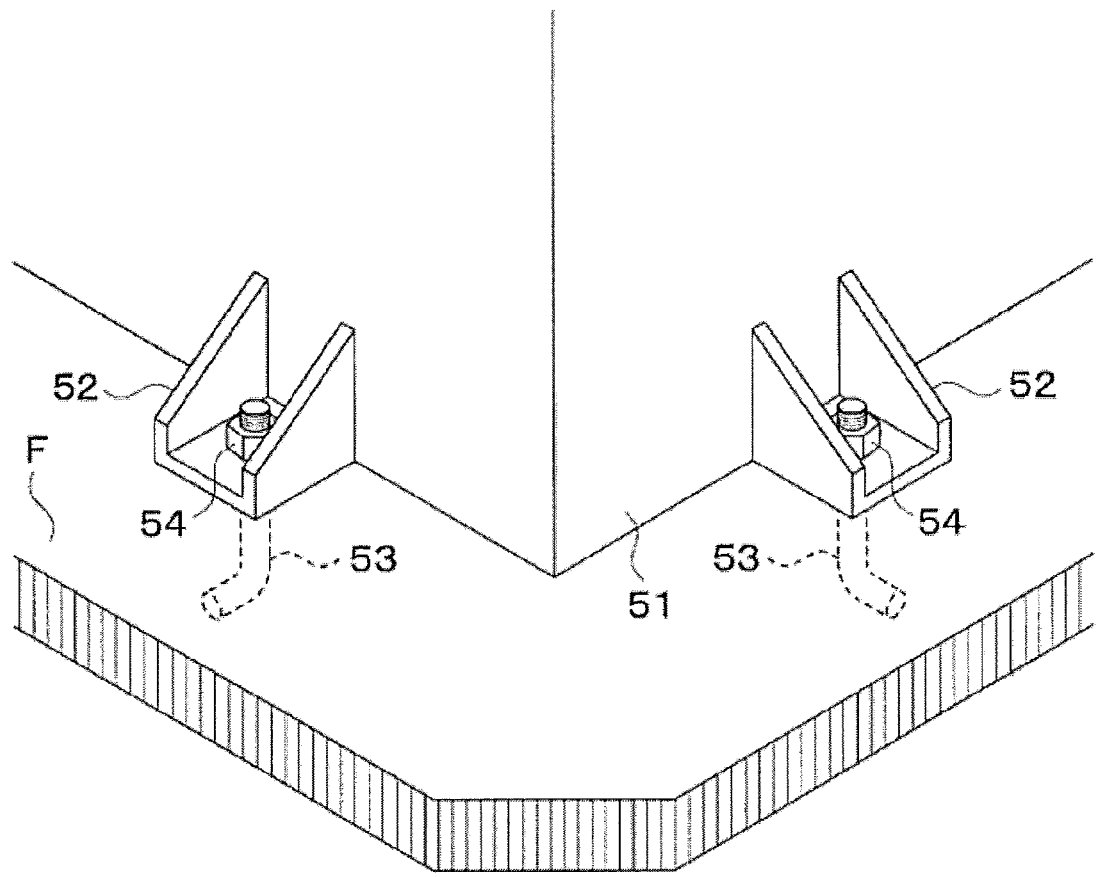

SEISMIC ISOLATION STRUCTURE FOR EQUIPMENT, AND SEISMIC ISOLATION METHOD

RELATED APPLICATIONS

This application is a 35 U.S.C. 371 national stage filing of International Application PCT/JP2013/000999, filed Feb. 21, 2013, which claims priority to Japanese Patent Application No. 2012-036035 filed on Feb. 22, 2012 in Japan. The contents of the aforementioned application s are hereby incorporated by reference.

FIELD OF THE INVENTION

The present invention relates to seismic isolation structures and seismic isolation methods for preventing vibration, noise, and toppling, due to an earthquake, of a variety of equipment, such as machines, tanks, showcases, etc., installed on floor surfaces.

TECHNICAL BACKGROUND

Conventionally, facilities installed in factories, etc., are typically secured to the floor surfaces with anchor bolts. For example, the equipment 51 shown in FIG. 13 is installed via nuts 54 on a concrete floor surface F with anchor bolts 53 that penetrate leg portions 52. However, there are types of equipment for which anchor bolts 53 cannot be used as means for preventing its toppling. For example, pieces of equipment on production lines of drinking water or food or in kitchens are installed with their legs set on waterproof floor surfaces F without using anchor bolts in order to meet the hygienic requirements and ensure the transportability of the equipment.

Additionally, seismic isolation structures with vibration-proof rubber interposed between the equipment and the floor surfaces are widely used for the ease of their installation. Patent Document 1 proposes a technology for preventing toppling of a gravestone by embedding spherical bodies in elastic sheets, interposing the elastic sheets between the middle stone and the headstone, and allowing plastic deformation of the spherical bodies to efficiently absorb the vibrations of an earthquake.

PRIOR ART DOCUMENTS

Patent Documents

Patent Document 1: Japanese Patent No. 4238277

SUMMARY OF THE INVENTION

Problems to Be Solved by the Invention

Conventional seismic isolation structures using anchor bolts, however, are not only inapplicable to waterproof floor surfaces or transportable equipment but also require large-scale earthquake-proof works for existing equipment. According to the conventional seismic isolation structures using vibration-proof rubber, disadvantageously, a lateral vibration of earthquakes tends to cause the leg sections of heavy objects to slide laterally, and the earthquake-proof works may render the installation environment of the equipment unhygienic as rubbish and impurities tend to gather around the vibration-proof rubber.

In view of the above, the object of the present invention is to provide seismic isolation structures and methods broadly applicable to a variety of floor surfaces and equipment while improving the vibration-proof, sound-proof, or seismic performance of existing heavy objects through simple and hygienic installation works.

Means to Solve the Problem

In order to solve the above-identified problem, the invention provides the following seismic isolation structures and installation methods:

(1) A seismic isolation structure characterized by comprising: a vibration-damping pad having at least one plastically deformable support body embedded in a gel-like elastic body; and a pressurizing plate that bears weight of equipment to apply pressure to the vibration-damping pad, wherein the pressurizing plate is formed with a larger plane area than that of the vibration-damping pad, the vibration-damping pad is set on a floor surface, the pressurizing plate is joined to the vibration-damping pad, and a caulking compound is packed around the vibration-damping pad in an opening between the pressurizing plate and the floor surface.

(2) A seismic isolation structure characterized in that a gap for permitting deformation of the gel-like elastic body is formed between the vibration-damping pad and the caulking compound.

(3) A seismic isolation structure characterized in that a restraint wall is provided under the pressurizing plate to prevent the caulking compound from entering the gap.

(4) A seismic isolation structure characterized in that the restraint wall is formed with a height smaller than the thickness of the vibration-damping pad under pressure.

(5) A seismic isolation structure characterized in that a reinforcement plate is bonded to an undersurface of the pressurizing plate and the restraint wall is formed along the circumference of the reinforcement plate.

(6) A seismic isolation structure characterized in that the restraint wall is formed in the shape of a ring that surrounds the vibration-damping pad and kept on an undersurface of the pressurizing plate.

(7) A seismic isolation structure characterized in that a porous material is disposed in a gap between the vibration-damping pad and the caulking compound and the porous material has sufficient flexibility to permit deformation of the gel-like elastic body.

(8) A seismic isolation structure characterized in that the gel-like elastic body is provided with an adhesive layer on top and bottom surfaces thereof, the bottom-surface adhesive layer bonding the vibration-damping pad to the floor surface and the top-surface adhesive layer keeping the pressurizing plate on the vibration-damping pad.

(9) A seismic isolation method characterized by comprising the steps of: preparing a vibration-damping pad having at least one plastically deformable support body embedded in a gel-like elastic body; preparing a pressurizing plate with a plane area larger than that of the vibration-damping pad; setting the vibration-damping pad on a floor surface; joining the pressurizing plate to a surface of the vibration-damping pad; mounting a leg section of equipment on the pressurizing plate; packing a caulking compound around the vibration-damping pad in an opening between the pressurizing plate and the floor surface while pressure is applied to the vibration-damping pad by a load of the equipment.

(10) A seismic isolation method characterized by comprising the step of providing a restraint wall for blocking the caulking compound under the pressurizing plate prior to packing the caulking compound.

(11) A seismic isolation method characterized in that once the caulking compound is packed, a gap for permitting deformation of the gel-like elastic body is formed between the vibration-damping pad and the caulking compound by the restraint wall.

(12) A seismic isolation method characterized in that the restraint wall is formed with a height smaller than the thickness of the vibration-damping pad under pressure.

(13) A seismic isolation method characterized in that the restraint wall is formed along the circumference of a reinforcement plate that is bonded to an undersurface of the pressurizing plate, and wherein in the step of joining the pressurizing plate, the restraint wall is disposed around the vibration-damping pad.

(14) A seismic isolation method characterized in that the restraint wall is formed in the shape of a ring separated from the pressurizing plate, and wherein in the step of disposing the restraint wall, the restraint wall is kept on an undersurface of the pressurizing plate around the vibration-damping pad.

(15) A seismic isolation method characterized in that in the step of setting the vibration-damping pad, a bottom-surface adhesive layer of the gel-like elastic body is bonded to the floor surface and in the step of joining the pressurizing plate, the pressurizing plate is bonded to a top-surface adhesive layer of the gel-like elastic body.

Effect of the Invention

According to the seismic isolation structures and methods of the present invention, the vibration-damping pad effectively absorbs vibration of equipment using the combination of the gel-like elastic body and the plastically deformable support body. This eliminates the need for using anchor bolts, making the seismic isolation structures broadly applicable to a variety of floor surfaces and equipment while improving the vibration-proof, sound-proof, and seismic performance of existing equipment through simple installation work. Furthermore, as the caulking compound seals the opening between the pressurizing plate and the floor surface around the vibration-damping pad, the present invention provides the effect of preventing adhesion and entry of rubbish and impurities, thus providing a hygienic seismic isolation structure.

BRIEF DESCRIPTION OF THE DRAWINGS

FIG. 13 is a perspective view that shows a prior art using anchor bolts.

MODES TO CARRY OUT THE INVENTION

Figure 6:
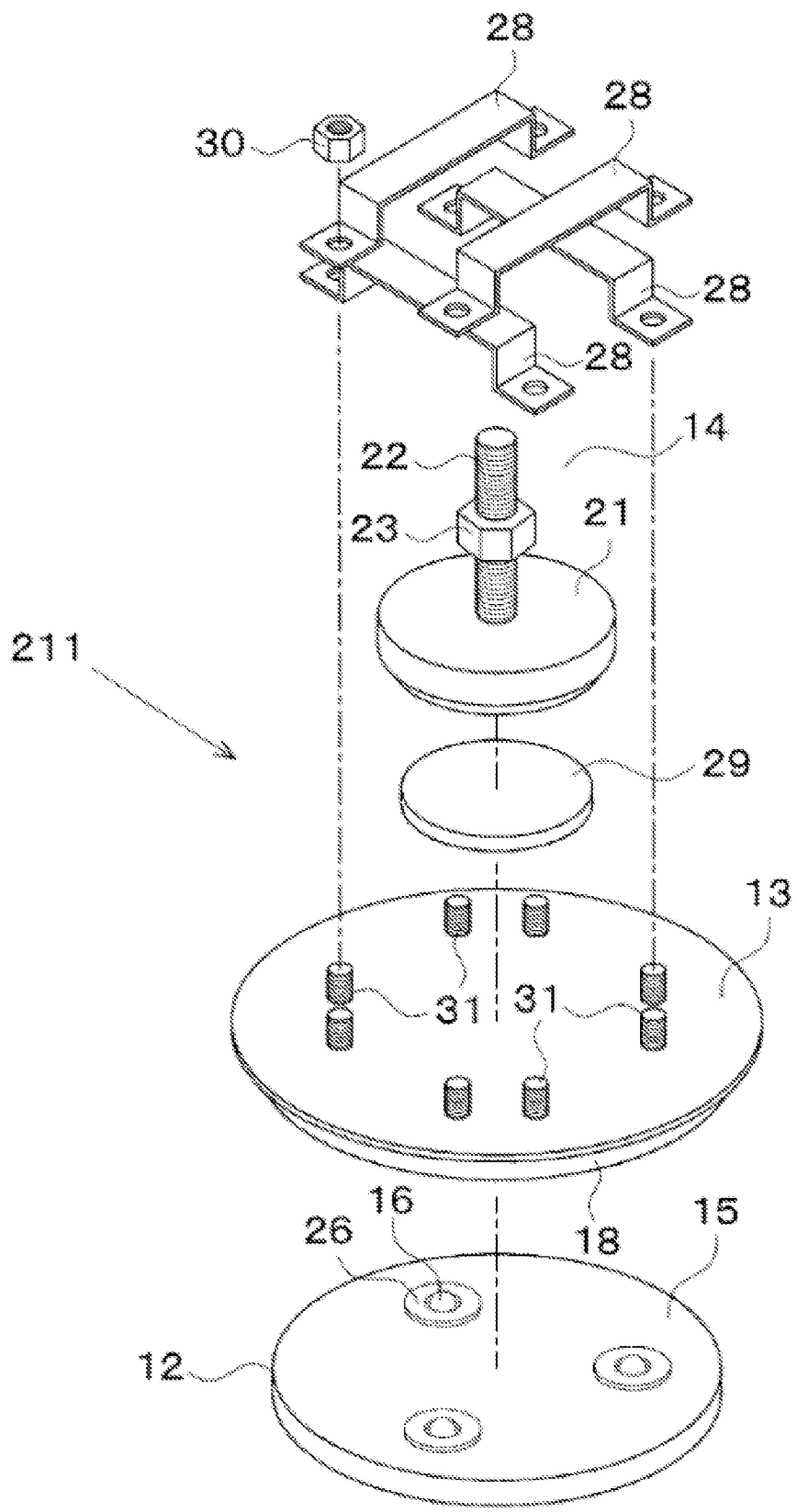
FIG. 6 is a perspective exploded view of a seismic isolation structure representing Embodiment 2 of the present invention.
Figure 7:
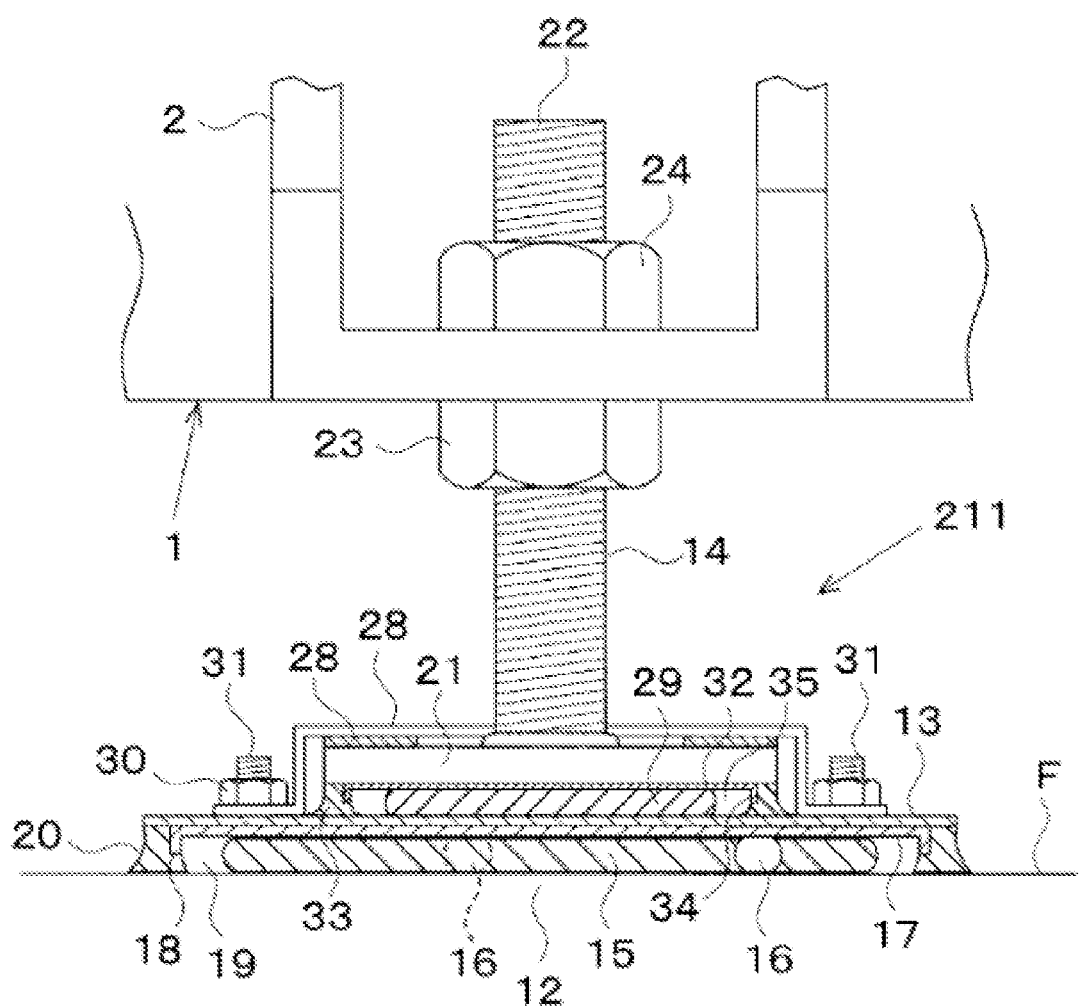
FIG. 7 is a cross-sectional view showing the seismic isolation structure of FIG. 6 fitted on a leg section of a piece of equipment.
Figure 8:
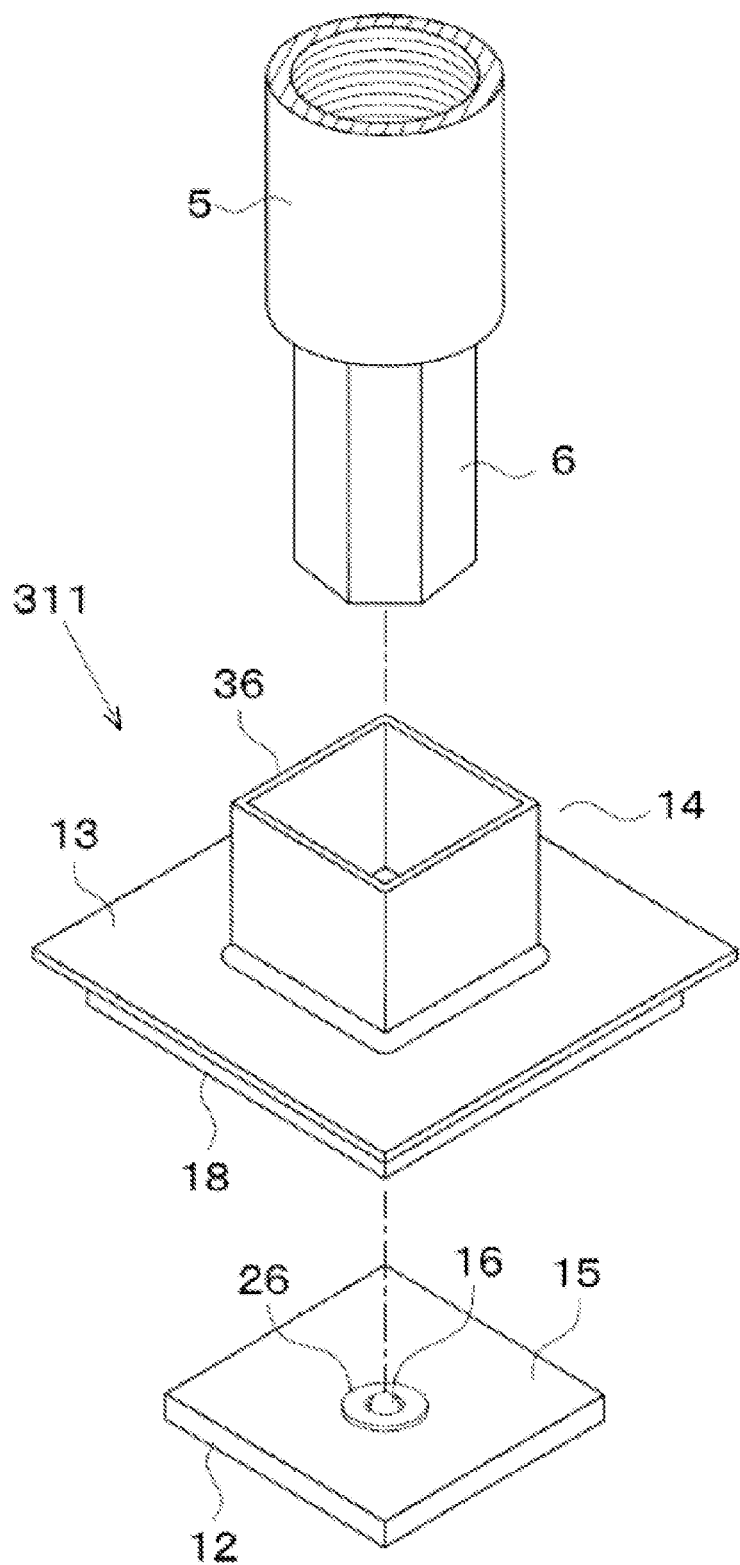
FIG. 8 is a perspective exploded view of a seismic isolation structure representing Embodiment 3 of the present invention.
Figure 9:
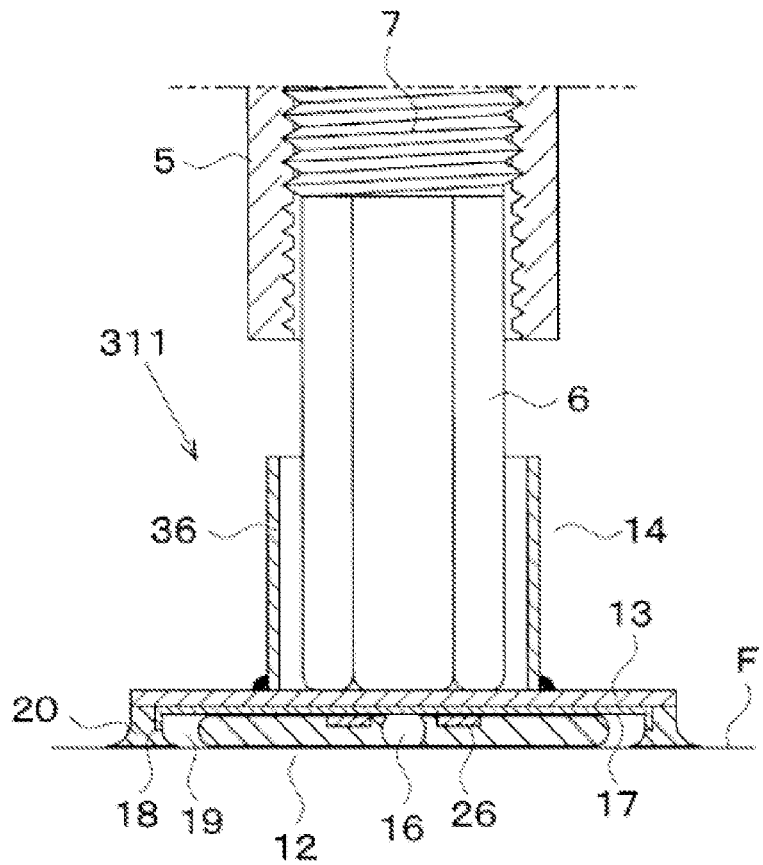
FIG. 9 is a cross-sectional view showing how the seismic isolation structure of FIG. 8 is installed.
Figure 9:
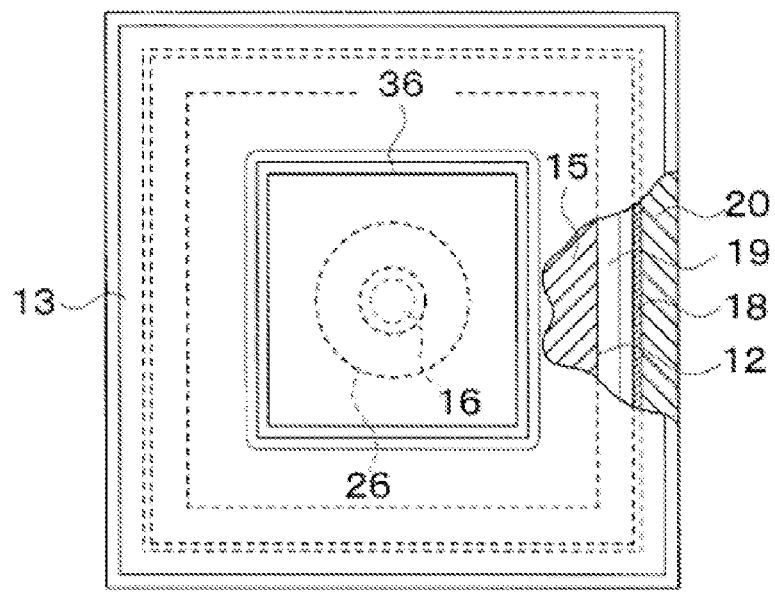
Figure 10:
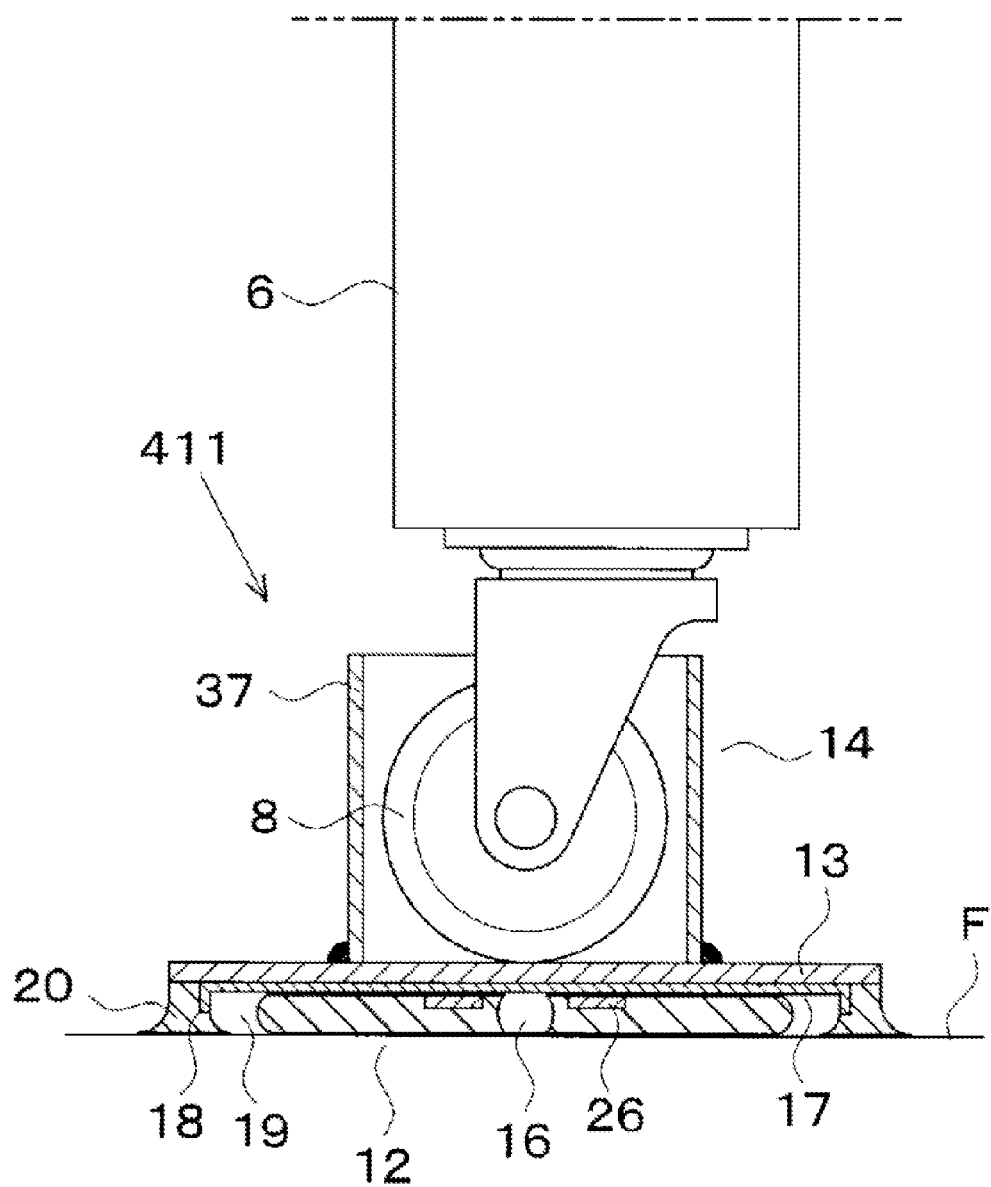
FIG. 10 is a cross-sectional view of a seismic isolation structure representing Embodiment 4 of the present invention.

Embodiments of the present invention will be described hereinafter with reference to the drawings, in which: FIGS. 1-5 show seismic isolation structures 11 of Embodiment 1; FIGS. 6 and 7 show a seismic isolation structure 211 of Embodiment 2; and FIGS. 8 and 9 show a seismic isolation structure 311 of Embodiment 3; and FIG. 10 shows a seismic isolation structure 411 of Embodiment 4. In each of the views, identical symbols designate identical or similar elements.

Embodiment 1

Figure 1:
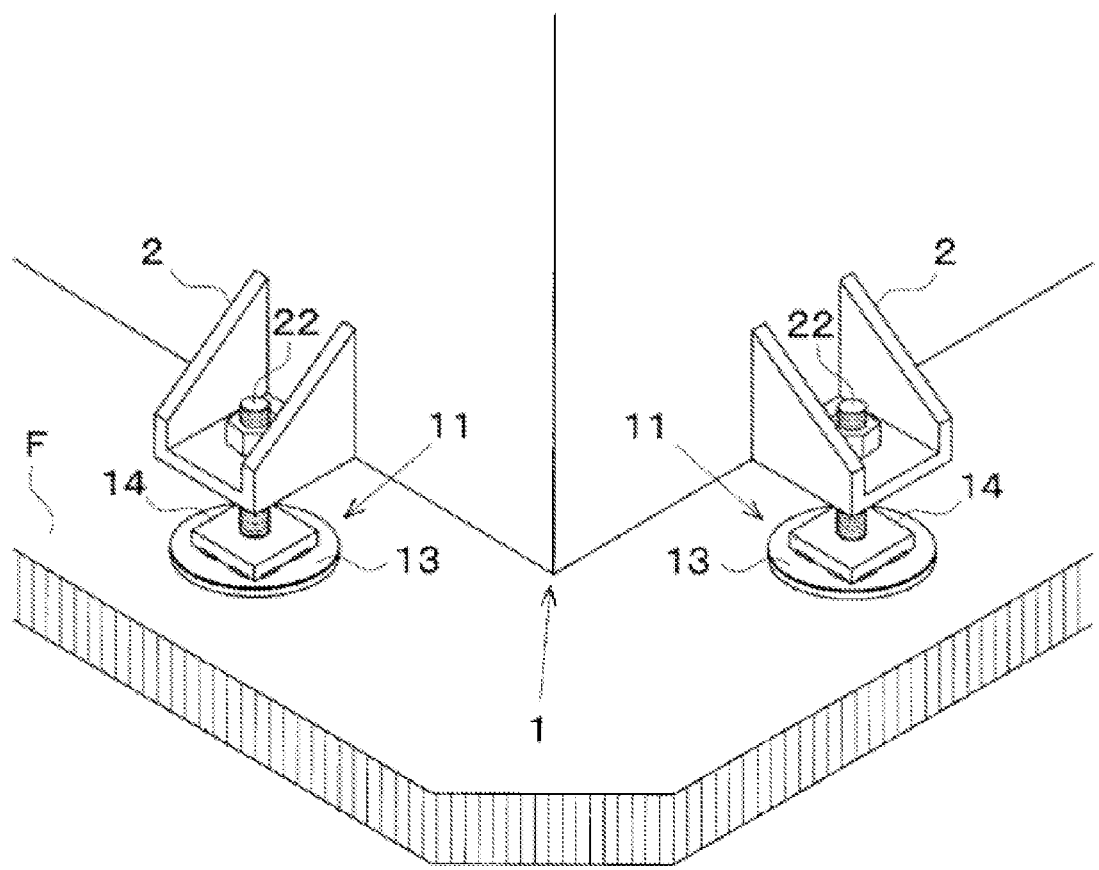
FIG. 1 is a perspective view of a seismic isolation structure representing Embodiment 1 of the present invention.
Figure 2:
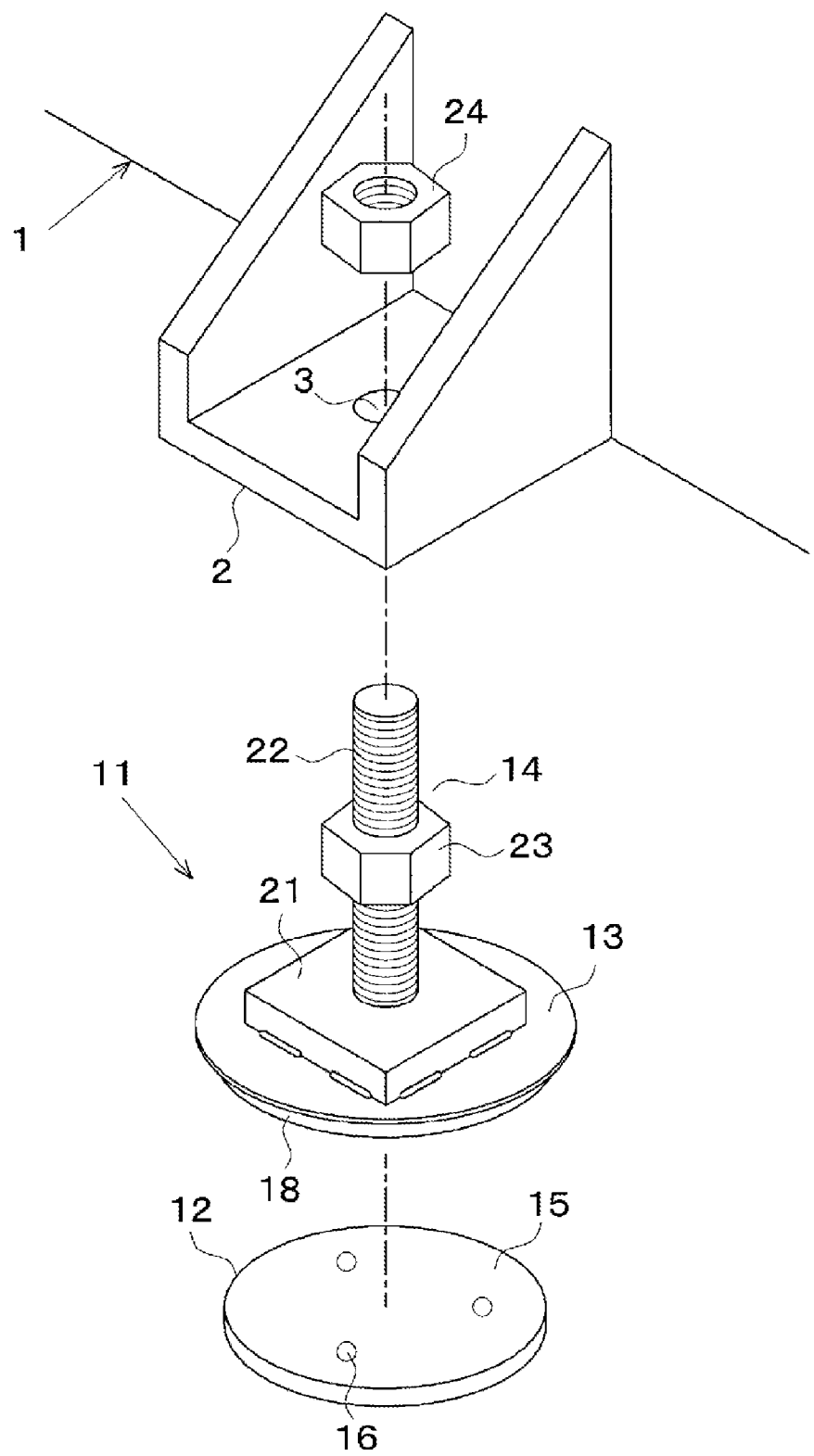
FIG. 2 is a perspective exploded view showing the seismic isolation structure of FIG. 1.

As shown in FIGS. 1 and 2, the seismic isolation structures 11 of Embodiment 1 are provided between a piece of equipment 1, which is a heavy object, and a waterproofed floor surface F. The equipment 1 includes a plurality of leg portions 2, whereas the seismic isolation structures 11 include mechanisms for adjusting the heights of the leg portions 2 with respect to the floor surface F. The seismic isolation structures 11 are provided with vibration-damping pads 12 (see FIG. 2) set on the floor surface F, pressurizing plates 13 that press against the vibration-damping pads 12, and holders 14 that restrain the leg portions 2 of the equipment 1 on the pressurizing plates 13.

Figure 3:
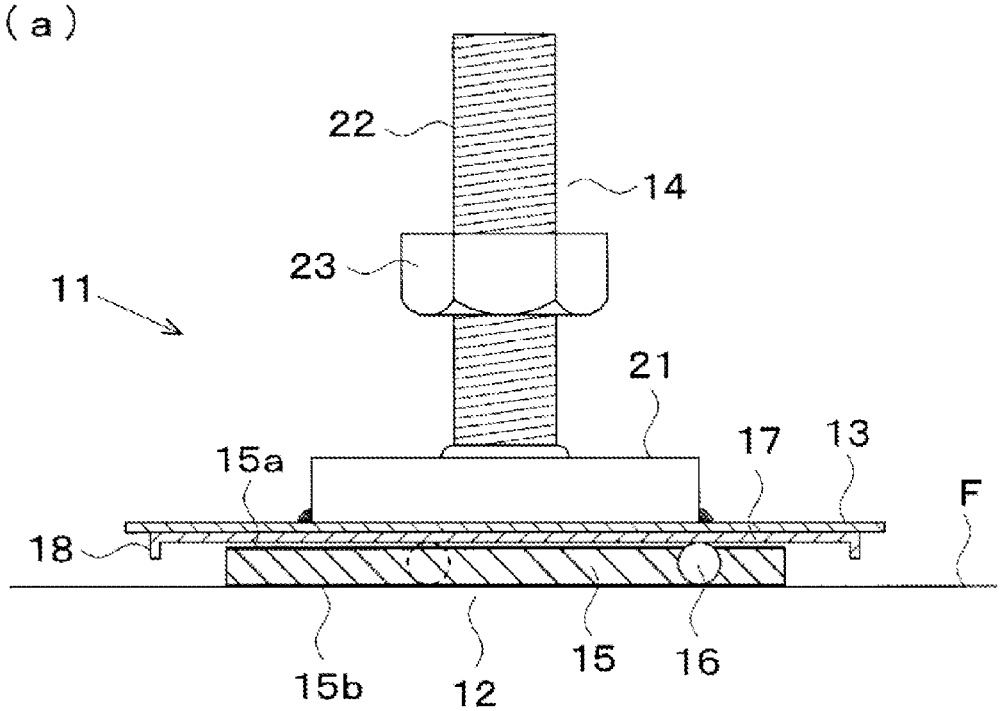
FIG. 3 is a cross-sectional view showing a procedure to install the seismic isolation structure of FIG. 1.
Figure 3:
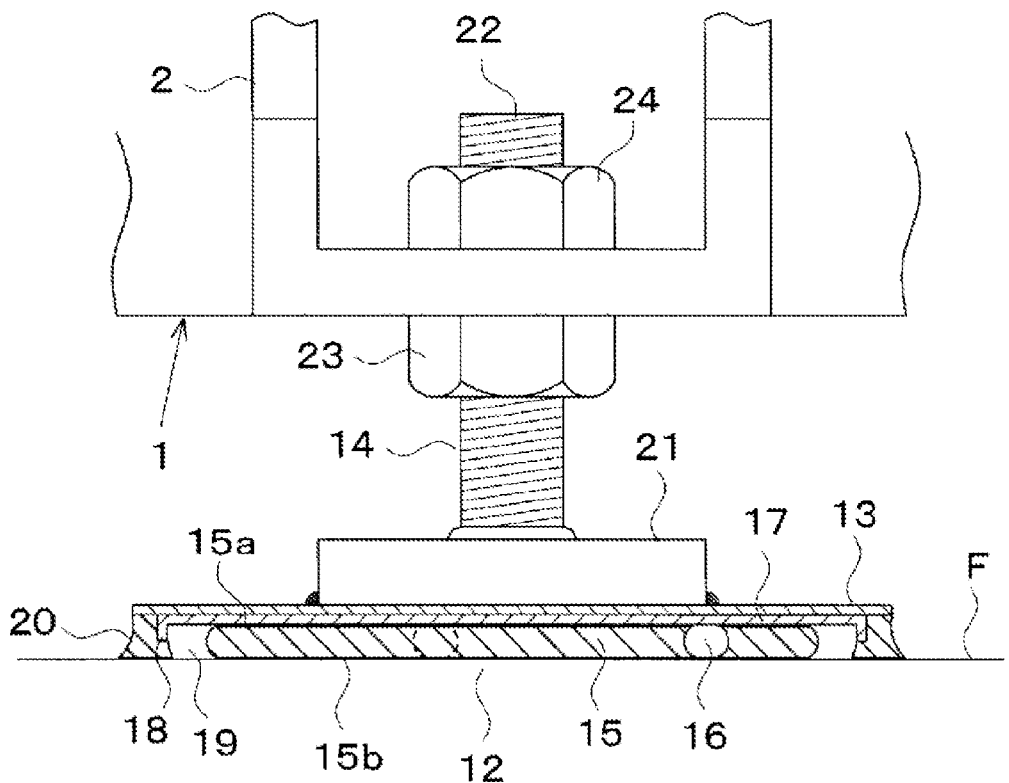
Figure 4:
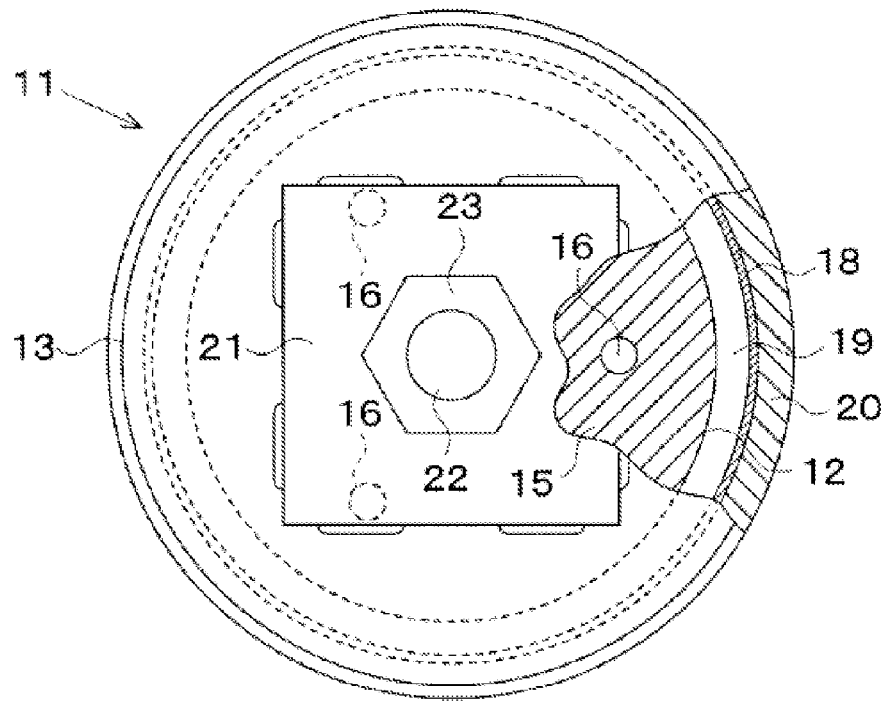
FIG. 4 is a cutaway view of a main part of the seismic isolation structure showing how a caulking compound is applied.
Figure 4:
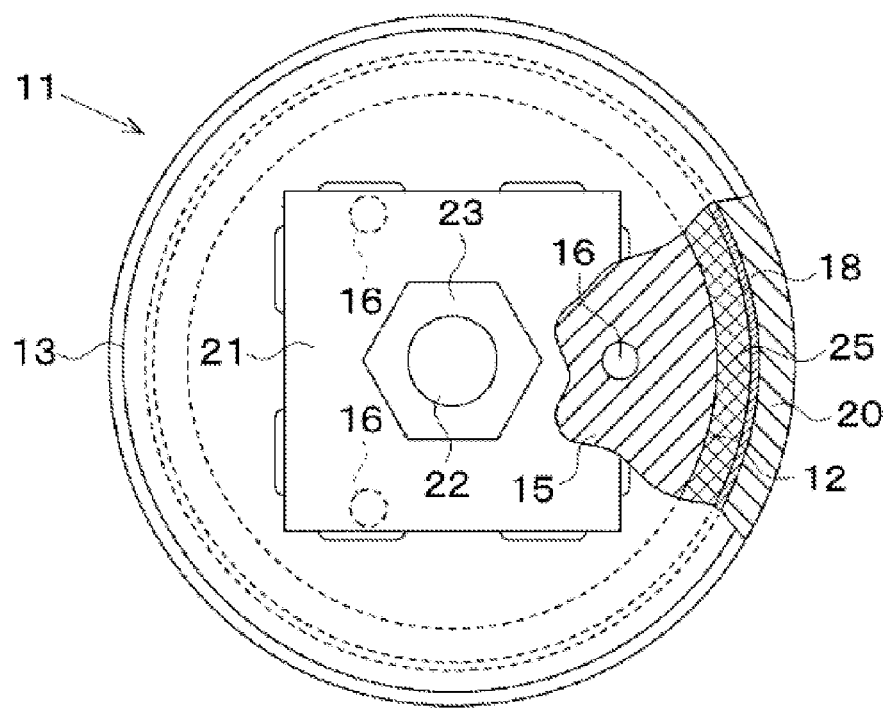

As shown in FIGS. 2 and 3, a vibration-damping pad 12 is comprised of a gel-like elastic body 15 having elasto-viscosity and plastically deformable support bodies 16. The gel-like elastic body 15 is formed of a transparent or translucent polymeric material in a circular shape. Adhesive layers 15a and 15b (see FIG. 3) are provided on the bottom and top surfaces of the gel-like elastic body 15, such that the vibration-damping pad 12 is bonded to the floor surface F by the bottom-surface adhesive layer 15b and the pressurizing plate 13 is kept on the vibration-damping pad 12 by the top-surface adhesive layer 15a.

The support bodies 16 are formed in a spherical shape having a diameter slightly greater than the thickness of the gel-like elastic body 15, and, for example, three support bodies 16 are embedded at equiangular positions in each gel-like elastic body 15. When the vibration-damping pad 12 is in its natural state (see FIG. 3a), top portions of the support bodies 16 are exposed above the top-surface adhesive layer 15a of the gel-like elastic body 15, and when the vibration-damping pad 12 is under pressure (see FIG. 3b), the support bodies 16 are compressed to the same height as the thickness of the gel-like elastic body 15.

The pressurizing plate 13 is formed of stainless steel in a circular shape having a larger plane area than that of the vibration-damping pad 12 and adapted to bear weight of the equipment 1 to compress the entire vibration-damping pad 12 with a uniform force. A reinforcement plate 17 also made of stainless steel is welded to the bottom surface of the pressurizing plate 13. The reinforcement plate 17 is formed in a circular shape having a diameter greater than that of the vibration-damping pad 12 and smaller than that of the pressurizing plate 13, and a restraint wall 18 projects downward from the reinforcement plate 17 along its circumference.

As shown in FIGS. 3 and 4(a), the restraint wall 18 is formed with a height that does not allow its lower edge to come into contact with the floor surface F even when the vibration-damping pad 12 is compressed. Formed within the restraint wall 18 is a gap 19 that permits radial deformation of the gel-like elastic body 15. Packed outside of the restraint wall 18 is a caulking compound 20 for sealing the opening between the outer periphery of the pressurizing plate 13 and the floor surface F. The restraint wall 18 prevents the caulking compound 20 from entering the gap 19 so as not to impede the deformation of the vibration-damping pad 12. Note that in the seismic isolation structure 411 shown in FIG. 4(b), a flexible member 25 made of a porous material, such as urethane foam, etc., is disposed in the gap between the vibration-damping pad 12 and the caulking compound 20.

The holder 14 is comprised of a base 21, a bolt 22, an adjustment nut 23, and a lock nut 24. The base 21 is secured by welding to the pressurizing plate 13 and the bolt 22 is erected at the center of the base 21. The top end of the bolt 22 penetrates the through-hole 3 of the leg section 2 (see FIG. 2) to restrain the leg section 2 on the pressurizing plate 13 from moving laterally. The adjustment nut 23 and the lock nut 24 are in threading engagement with the bolt 22 above and below the leg section 2 so as to permit adjustment of the height of the leg section 2.

To install the seismic isolation structure 11, first, as shown in FIG. 3(a), the bottom-surface adhesive layer 15b of the vibration-damping pad 12 is bonded to the floor surface F, and the pressurizing plate 13 is bonded to the top-surface adhesive layer 15a of the vibration-damping pad 12. Next, as shown in FIG. 3(b), after the height is adjusted with the nuts 23 and 24, the leg section 2 is restrained with the holder 14. Subsequently, a caulking compound 20 is packed around the vibration-damping pad 12 and in the opening between the pressurizing plate 13 and the floor surface F. In this way, the vibration-proof, sound-proof, and seismic performance of the existing equipment 1 can be improved through very simple installation work without using anchor bolts. Furthermore, as the vibration-damping pad 12 absorbs vibration of the equipment, loosening of screws, wear, and damage can be effectively controlled. In particular, the circumference of the vibration-damping pad 12 can be sealed with the caulking compound 20 to prevent entry of rubbish and impurities, thus keeping the area surrounding the leg section 2 in a hygienic condition.

Figure 5:
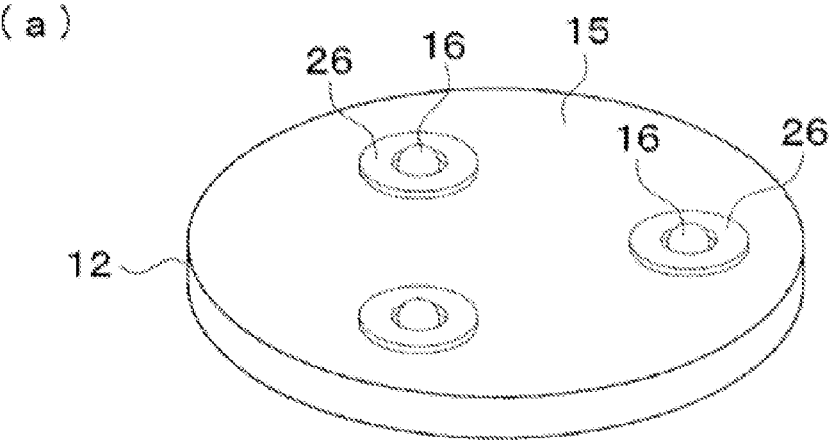
FIG. 5 shows a perspective view showing a vibration-damping pad that is different from that of FIG. 2 and a cross-sectional view showing a seismic isolation structure using that pad.
Figure 5:
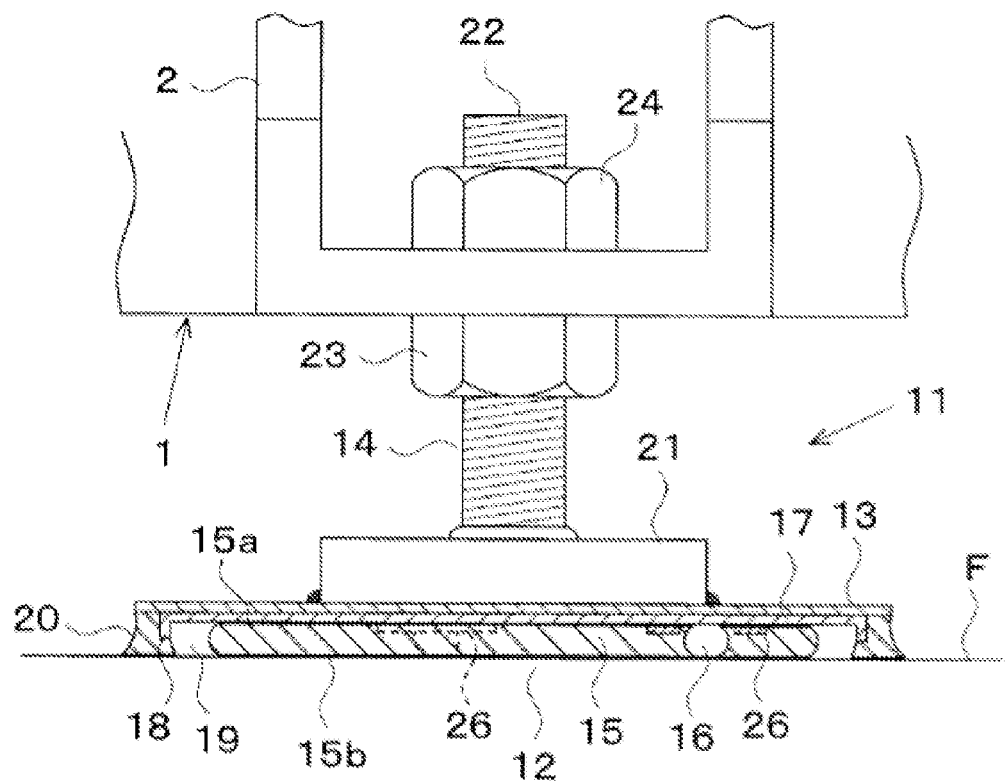

According to the seismic isolation structure 11 shown in FIG. 5, circular rings 26 made of a metal or resin material are embedded in the gel-like elastic body 15 of a vibration-damping pad 12, and support bodies 16 are disposed in the rings 26. According to this structure, the support bodies 16 are firmly supported by the rings 26 at equiangular positions in the gel-like elastic body 15, thus maintaining the vibration-absorbing performance of the vibration-damping pad 12 for a long period of time.

Embodiment 2

In the seismic isolation structure 211 shown in FIGS. 6 and 7, the base 21 of the holder 14 is clamped to the pressurizing plate 13 by four arcuate members 28 with a vibration-proof rubber 29 interposed between the base 21 and the pressurizing plate 13. The arcuate members 28 are assembled to intersect one another and fastened to bolts 31 provided on the pressurizing plate 13 with nuts 30. Bonded to the under surface of the base 21 is an intermediate plate 32 that is provided with a restraint wall 34 formed along the circumference thereof for blocking a caulking compound 33. Additionally, the vibration-proof rubber 29 is disposed within the restraint wall 34 via a gap 35 such that the two upper and lower tiers of elastic members comprised of the vibration-proof rubber 29 and the vibration-damping pad 12 are configured to provide improved vibration absorption. Moreover, the two upper and lower tiers of caulking compounds 20 and 33 are configured to ensure a hygienic environment for the installed equipment.

Embodiment 3

According to the seismic isolation structure 311 shown in FIGS. 8 and 9, the holder 14 includes a columnar member 36 surrounding a leg section 6 of equipment 5 (only a part thereof is shown), and the leg section 6 is restrained on the pressurizing plate 13 by the columnar member 36 from moving laterally. The leg section 6 is attached to the equipment 5 in such a manner as to allow adjustment of its height with a screw 7, and the leg section 6 is also removably inserted in the interior of the columnar member 36. As in Embodiment 1, a caulking compound 20 is provided around the vibration-damping pad 12 via the gap 19 and the restraint wall 18. Accordingly, the seismic isolation structure 311 of Embodiment 3 is preferably applicable to equipment, such as kitchen equipment and showcases, that is relatively light in weight and capable of being easily maintained in hygienic condition and need to be transportable. Note that in the illustrated vibration-damping pad 12, a single support body 16 and a single ring 2 are embedded at the center of the gel-like elastic body 15.

Embodiment 4

According to the seismic isolation structure 411 of Embodiment 4 shown in FIG. 10, the holder 14 includes a columnar member 37 surrounding a wheel 8 of a leg section 6, and the wheel 8 is restrained on the pressurizing plate 13 by the columnar member 37 from rolling laterally. Therefore, in particular, the seismic isolation structure 411 of Embodiment 4 can prevent transportable equipment provided with wheels 8 from rolling out of control due to an earthquake.

Figure 11:
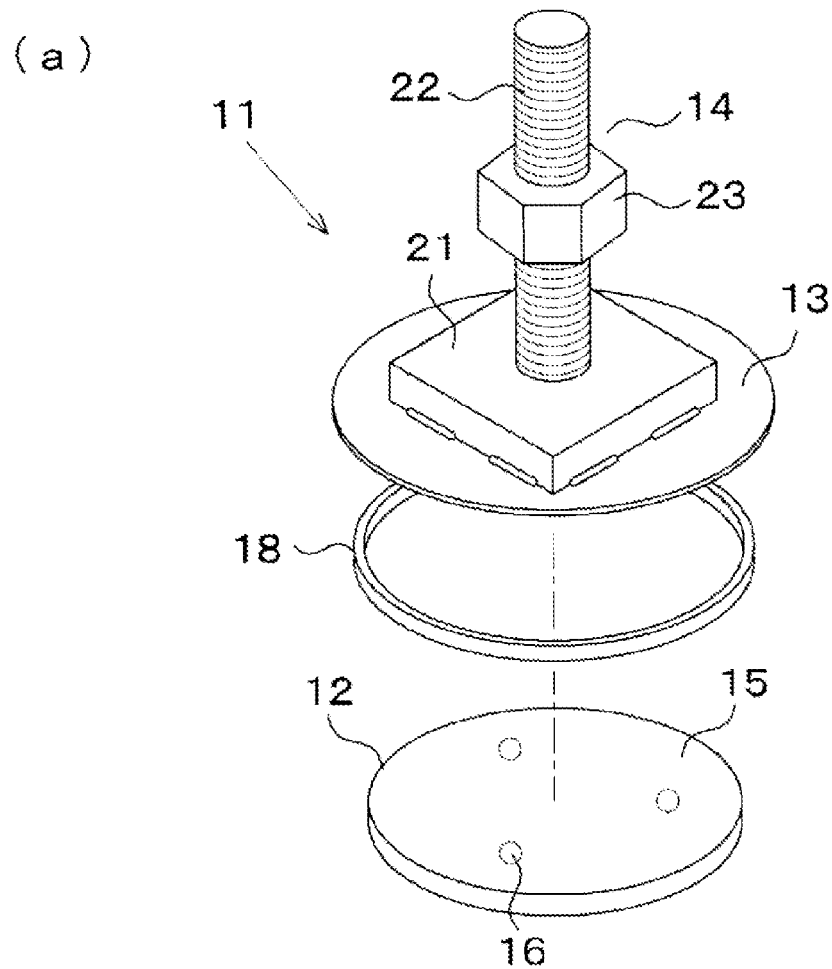
FIG. 11 shows a perspective view and a partially cross-sectional view of a seismic isolation structure representing a modification of Embodiment 1.
Figure 11:
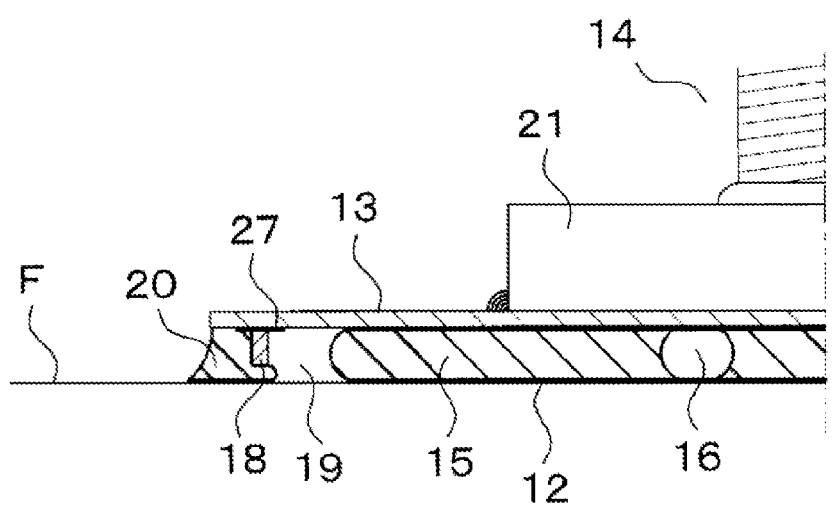

The present invention is not limited to the foregoing embodiments and, as illustrated below, can still be carried out with the shapes and structures of various components altered as required, without deviating from the spirit of the present invention:

(1) In the seismic isolation structure 11 of Embodiment 1, the reinforcement plate 13 (see FIG. 3) may be omitted while providing the restraint wall 18 in the shape of a ring detached from the pressurizing plate 13 as shown in FIG. 11. To carry out installation, the vibration-damping pad 12 is bonded to the floor surface F, and the restraint wall 18 is kept on the undersurface of the pressurizing plate 13 with a double-sided tape 27 so as to surround the vibration-damping pad 12 from outside. Then, the pressurizing plate 13 is bonded to the vibration-damping pad 12, and a caulking compound 20 is packed in the opening between the pressurizing plate 13 and the floor surface F such that the restraint wall 18 can block the compound. This will provide an effect equivalent to that of Embodiment 1 with a simpler and more inexpensive structure.

Figure 12:
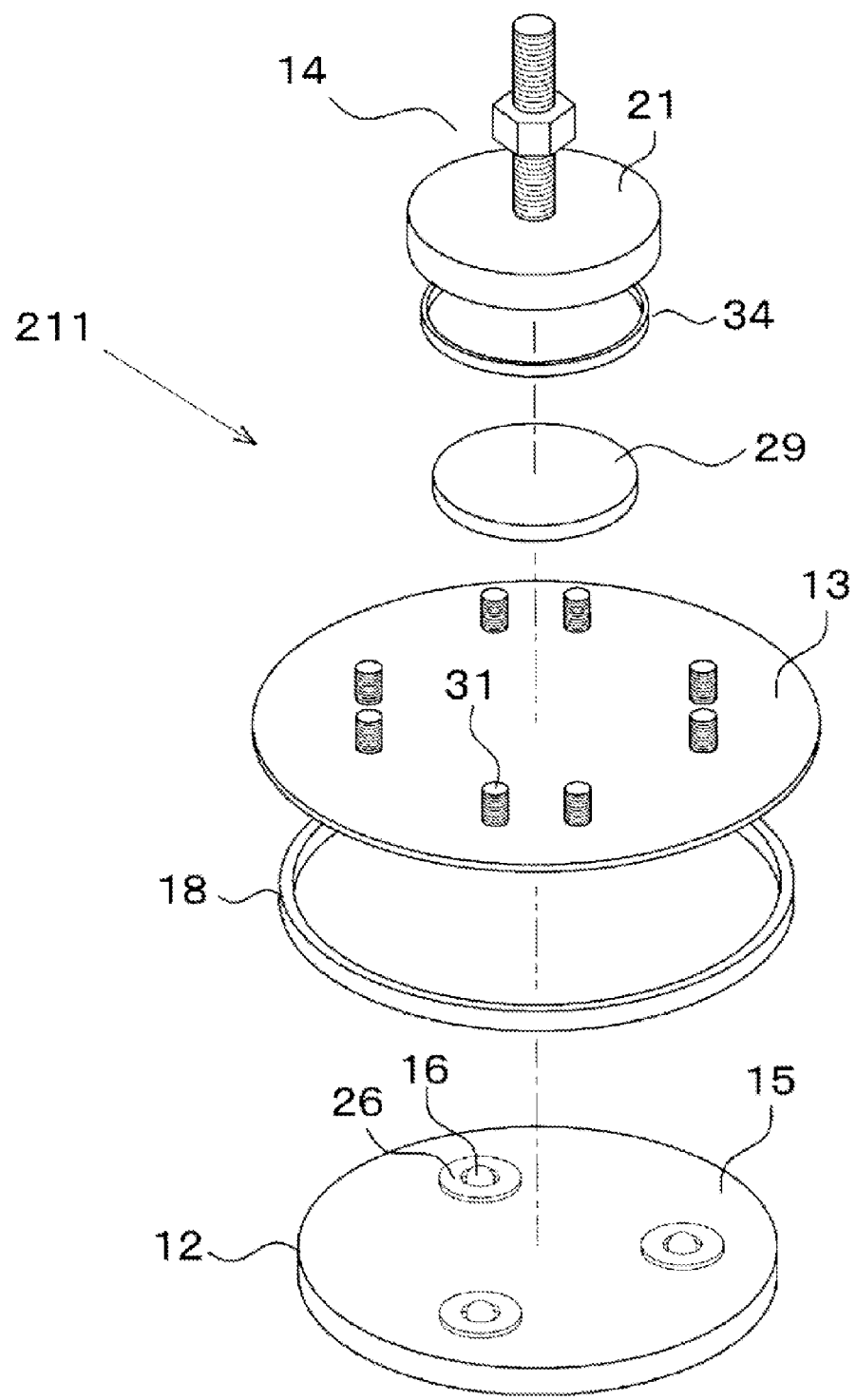
FIG. 12 is a perspective view of a seismic isolation structure representing a modification of Embodiment 2.

(2) In the seismic isolation structure 211 of Embodiment 2, both of the reinforcement plate 13 and the intermediate plate 32 (see FIG. 7) may be omitted while providing the two restraint walls 18 and 34 both in the shape of a ring as separate members from the pressurizing plate 13 and the holder 14 as shown in FIG. 12 so as to block the caulking compounds 20 and 33 (see FIG. 7) with the restraint walls 18 and 34. This structure will also provide an effect equivalent to that of Embodiment 2 with a more inexpensive structure.

(3) In the seismic isolation structure 311 of Embodiment 3 (see FIG. 9) and the seismic isolation structure 411 of Embodiment 4 (see FIG. 10), the reinforcement plates 17 may be omitted while providing the restraint walls 18 in the shape of a ring as described in Item (1) above.

(4) The shapes and structures of any other components may also be modified to suit the particular application of the seismic isolation structure.

LEGENDS

1: Equipment
2: Leg section
11: Seismic isolation structure
12: Vibration-damping pad
13: Pressurizing plate
15: Gel-like elastic body
16: Support body
17: Reinforcement plate
18: Restraint wall
19: Gap
20: Caulking compound
25: Flexible member
F: Floor surface

The invention claimed is:

1. A seismic isolation structure, comprising:
a vibration-damping pad having at least one plastically deformable support body embedded in a gel-like elastic body; and
a pressurizing plate that bears weight of equipment to apply pressure to the vibration-damping pad,
wherein the pressurizing plate is formed with a larger plane area than that of the vibration-damping pad, the vibration-damping pad is set on a floor surface, the pressurizing plate is joined to the vibration-damping pad, and a caulking compound is packed around the vibration-damping pad in an opening between the pressurizing plate and the floor surface while pressure is applied by a load of the equipment to the vibration-damping pad via the pressurizing plate.

2. A seismic isolation structure in accordance with claim 1, where a gap for permitting deformation of the gel-like elastic body is formed between the vibration-damping pad and the caulking compound.

3. A seismic isolation structure in accordance with claim 2, where a restraint wall is provided under the pressurizing plate to prevent the caulking compound from entering the gap.

4. A seismic isolation structure in accordance with claim 3, where the restraint wall is formed with a height smaller than the thickness of the vibration-damping pad under pressure.

5. A seismic isolation structure in accordance with claim 4, wherein a reinforcement plate is bonded to an undersurface of the pressurizing plate and the restraint wall is formed along the circumference of the reinforcement plate.

6. A seismic isolation structure in accordance with claim 4, wherein the restraint wall is formed in the shape of a ring that surrounds the vibration-damping pad and kept on an undersurface of the pressurizing plate.

7. A seismic structure in accordance with claim 2, where a flexible member made of a porous material is disposed in the gap between the vibration-damping pad and the caulking compound.

8. A seismic isolation structure in accordance with claim 1, wherein the gel elastic body is provided with an adhesive layer on top and bottom surfaces thereof, the bottom-surface adhesive layer bonding the vibration-damping pad to the floor surface and the top-surface adhesive layer keeping the pressurizing plate on the vibration-damping pad.

9. A seismic isolation method, comprising the steps of:
providing a vibration-damping pad having at least one plastically deformable support body embedded in a gel-like elastic body;
providing a pressurizing plate with a plane area larger than that of the vibration-damping pad;
setting the vibration-damping pad on a floor surface;
joining the pressurizing plate to a surface of the vibration-damping pad;
mounting a leg section of equipment on the pressurizing plate;
packing a caulking compound around the vibration-damping pad in an opening between the pressurizing plate and the floor surface while pressure is applied by a load of the equipment to the vibration-damping pad via the pressurizing plate.

10. A seismic isolation method in accordance with claim 9, comprising the step of providing a restraint wall for blocking the caulking compound under the pressurizing plate prior to packing the caulking compound.

11. A seismic isolation method in accordance with claim 10, where once the caulking compound is packed, a gap for permitting deformation of the gel-like elastic body is formed between the vibration-damping pad and the caulking compound by the restraint wall.

12. A seismic isolation method in accordance with claim 11, where the restraint wall is formed with a height smaller than the thickness of the vibration-damping pad under pressure.

13. A seismic isolation method in accordance with claim 11, wherein the restraint wall is formed along the circumference of a reinforcement plate that is bonded to an undersurface of the pressurizing plate, and wherein in the step of joining the pressurizing plate, the restraint wall is disposed around the vibration-damping pad.

14. A seismic isolation method in accordance with claim 11, wherein the restraint wall is formed in the shape of a ring separated from the pressurizing plate, and wherein in the step of disposing the restraint wall, the restraint wall is kept on an undersurface of the pressurizing plate around the vibration-damping pad.

15. A seismic isolation method in accordance with claim 9, wherein in the step of setting the vibration-damping pad, bonding a bottom-surface adhesive layer of the gel-like elastic body to the floor surface and in the step of joining the pressurizing plate, bonding the pressurizing plate to a top-surface adhesive layer of the gel-like elastic body.

* * * * *